US010464502B2

United States Patent
Renn et al.

(10) Patent No.: US 10,464,502 B2
(45) Date of Patent: Nov. 5, 2019

(54) ROOF DITCH MOLDING END CAP

(71) Applicant: Nissan North America, Inc., Franklin, TN (US)

(72) Inventors: Jordan Renn, Royal Oak, MI (US); Jeffrey Tessmer, Novi, MI (US); Scott Nydam, Farmington Hills, MI (US); Hironori Awano, Kanagawa (JP); Kiyoshi Sagara, Kanagawa (JP); Daisuke Fujimoto, Tokyo (JP)

(73) Assignees: Nissan North America, Inc., Franklin, TN (US); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/884,088

(22) Filed: Jan. 30, 2018

(65) Prior Publication Data

US 2019/0232890 A1    Aug. 1, 2019

(51) Int. Cl.
*B60R 13/06* (2006.01)
*B62D 25/07* (2006.01)
*B60R 13/07* (2006.01)

(52) U.S. Cl.
CPC .............. *B60R 13/06* (2013.01); *B62D 25/07* (2013.01)

(58) Field of Classification Search
CPC ....... B60R 13/025; B60R 13/06; B60R 13/07; B60R 13/04; B62D 25/06; B62D 25/07
USPC ....................................... 296/210, 213, 1.08
See application file for complete search history.

(56) References Cited

U.S. PATENT DOCUMENTS

| 5,013,083 | A | * | 5/1991 | Yada | ....................... B60R 13/04 296/210 |
| 8,657,370 | B1 | | 2/2014 | Pierce et al. | |
| 8,979,181 | B2 | * | 3/2015 | Slack | ....................... B60R 13/04 296/210 |
| 2016/0082899 | A1 | * | 3/2016 | Shen | ....................... B60R 13/04 296/213 |
| 2017/0036706 | A1 | * | 2/2017 | Donabedian | ......... B62D 27/023 |

FOREIGN PATENT DOCUMENTS

| DE | 202013104713 U1 | | 12/2013 |
| JP | 10-086765 | * | 4/1985 |
| JP | 2002S249001 | * | 2/2002 |

OTHER PUBLICATIONS

Photographs of Roof Ditch for 2013 Chevrolet Silverado.
Photographs of Roof Ditch for 2015 Ford F150.
Photographs of Roof Ditch for 2013 Dodge Ram.

* cited by examiner

*Primary Examiner* — Dennis H Pedder
(74) *Attorney, Agent, or Firm* — Global IP Counselors, LLP

(57) ABSTRACT

A roof ditch molding end cap for a roof ditch of a vehicle includes a body member having a first attachment surface and a second attachment surface. The second attachment surface is disposed at an angle with respect to the first attachment surface. The first attachment surface is configured to slidably engage the roof ditch of the vehicle. The second attachment surface has a locking member configured to engage a second fastening member disposed in the roof ditch of the vehicle to substantially prevent movement of the roof ditch molding end cap.

15 Claims, 8 Drawing Sheets

ROOF DITCH MOLDING END CAP

BACKGROUND

Field of the Invention

The present invention generally relates to a roof ditch molding end cap. More specifically, the present invention relates to a roof ditch molding end cap having a first attachment surface configured to slidably engage a roof ditch of the vehicle and a second attachment surface configured to engage the roof ditch to substantially prevent movement of the roof ditch molding end cap.

Background Information

Most vehicles have seams defined between a roof panel and side panels. In recent model vehicles, this seam has been formed in a concave area at the side of the roof referred to as a roof ditch. In many such vehicles with roof ditches, a pair of molding members or molding assemblies are used to cover or conceal the roof ditch. These molding members are typically flush with surfaces of the roof panel and side panels. Such a molding member is connected to the roof ditch by double-sided tape, which adheres immediately to the vehicle making adjustments to the position of the molding member difficult.

SUMMARY

In view of the state of the known technology, one aspect of the present invention includes a roof ditch molding end cap for a roof ditch of a vehicle. The roof ditch molding end cap includes a body member having a first attachment surface and a second attachment surface. The second attachment surface is disposed at an angle with respect to the first attachment surface. The first attachment surface is configured to slidably engage the roof ditch of the vehicle. The second attachment surface has a locking member configured to engage a second fastening member disposed in the roof ditch of the vehicle to substantially prevent movement of the roof ditch molding end cap.

Another aspect of the present invention includes a vehicle body structure including a roof ditch and a roof ditch molding end cap. The roof ditch is defined by a support surface, a first wall surface extending outwardly from a first side of the support surface and a second wall surface extending outwardly from a second side of the support surface. The roof ditch has a second section disposed at a first angle with respect to a first section. A second fastening member extends outwardly from the support surface of the second section of the roof ditch. A roof ditch molding end cap is connected to the first and second sections of the roof ditch. The roof ditch molding end cap includes a body member having a first attachment surface and a second attachment surface. The second attachment surface is disposed at a second angle with respect to the first attachment surface. The first attachment surface slidably engages the first section of the roof ditch. The second attachment surface has a locking member receiving the second fastening member disposed in the second section of the roof ditch of the vehicle to substantially prevent movement of the roof ditch molding end cap with respect to the roof ditch.

Also other objects, features, aspects and advantages of the disclosed roof ditch molding end cap will become apparent to those skilled in the art from the following detailed description, which, taken in conjunction with the annexed drawings, discloses exemplary embodiments of the roof ditch molding end cap.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
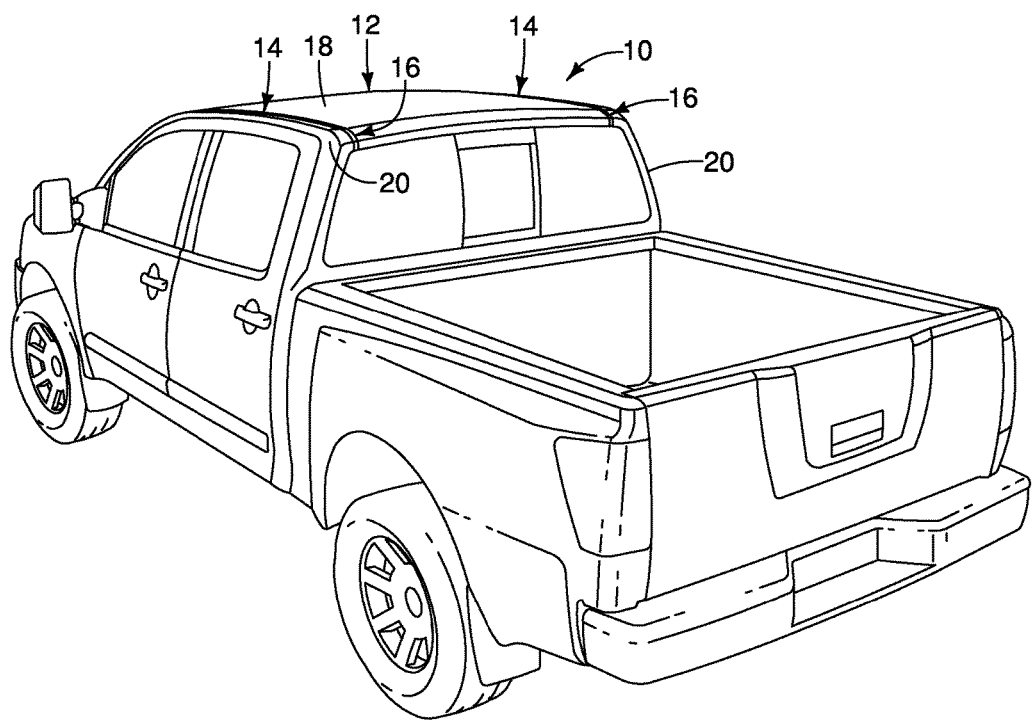
FIG. 1 is a rear perspective view of roof ditch molding part connected to a vehicle in accordance with an exemplary embodiment of the present invention.

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-4, a vehicle 10 is illustrated in accordance with a first exemplary embodiment of the present invention. The vehicle 10 includes a vehicle body structure 12 that defines a pair of roof ditches 14 in each of which a roof ditch molding end cap 16 is disposed. The vehicle 10 is illustrated as a pick-up truck. However, it will become apparent to those skilled in the art from the following detailed description that the present invention can be applied to other types of vehicles. Thus, the vehicle 10 will not be discussed or illustrated in detail herein, except to the extent that the parts of the vehicle 10 relate to the present invention.

As shown in FIGS. 1-4, the vehicle body structure 12 includes, among other things, a roof panel 18, a pair of side panels 20, and the roof ditch molding end caps 16. The roof panel 18 and the side panels 20 are typically formed of one or more pieces of sheet metal or any other suitable material that are welded or rigidly and fixedly attached together to form a substantially rigid portion of the vehicle body structure 12. The roof panel 18 and/or the side panels 20 can be further supported by other structural members, as needed and/or desired.

Figure 2:
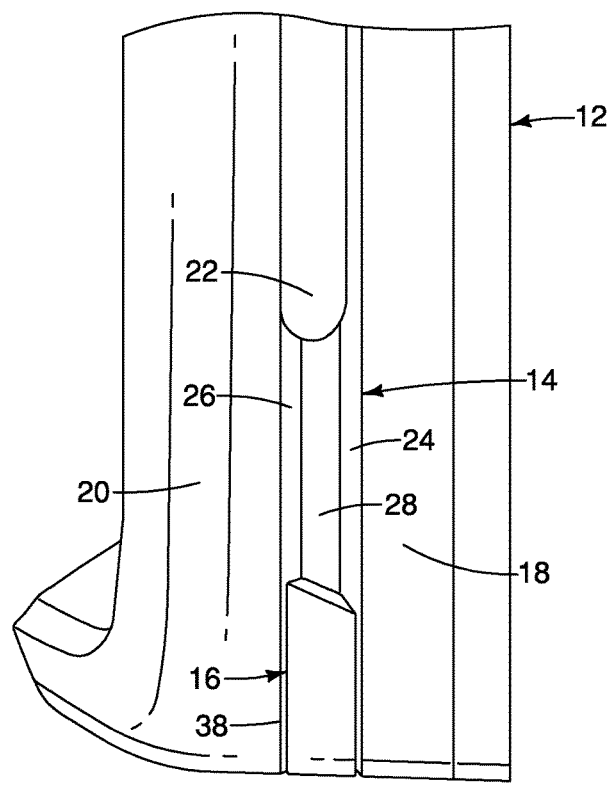
FIG. 2 is a top plan view of the vehicle of FIG. 1.
Figure 4:
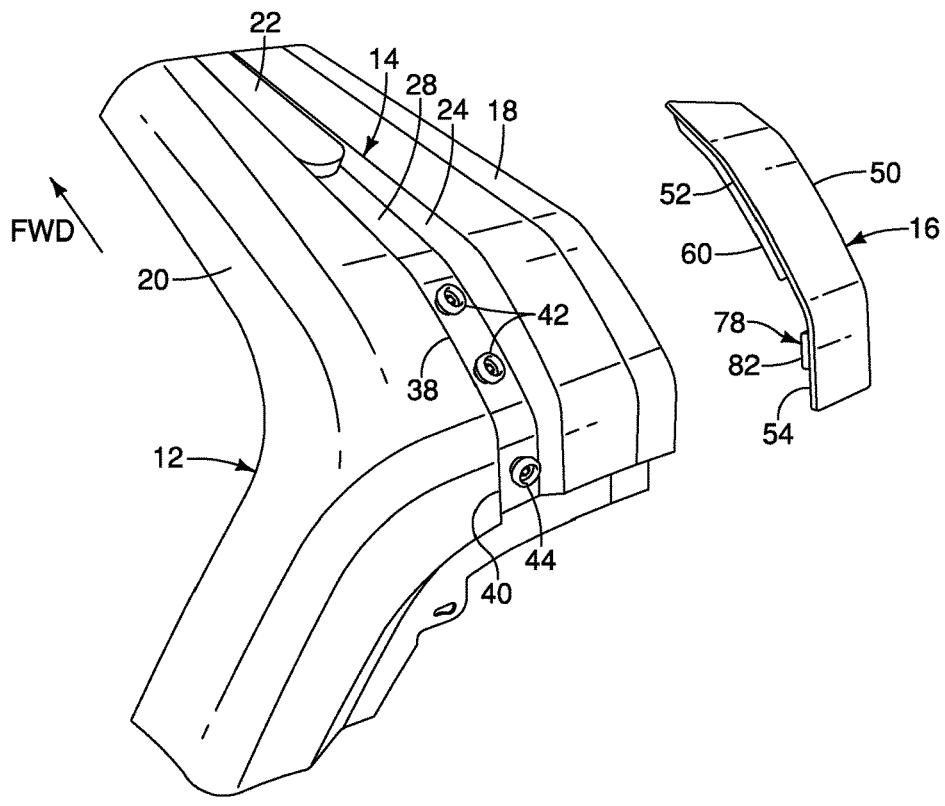
FIG. 4 is an exploded perspective view of the vehicle and the roof ditch molding part of FIG. 1.

The roof panel 18 and the side panels 20 are dimensioned, contoured and shaped to define the pair of roof ditches 14 that are spaced apart along the roof panel 18 in a direction that is perpendicular or substantially perpendicular to a longitudinal direction or lengthwise direction of the roof ditches 14. As shown in FIG. 2, the side panels 20 are fixed to the roof panel 18 such that the side panels 20 and the roof panel 18 collectively define the overall shape of the roof ditches 14. Each roof ditch 14 is thus a joint that is made by a connection between the roof panel 18 and a respective one of the side panels 20 of the vehicle 10. A sealant 22 can be used to seal a seam formed at the joint between the roof panel 18 and each of the side panels 20, as shown in FIGS. 2 and 4. The end of the sealant 22 can be spaced from the roof ditch molding end cap 16, as shown in FIG. 2. Alternatively, a forward end of the roof ditch molding end cap 16 can overlie a rearward end of the sealant 22.

The roof ditches 14 are contoured and shaped to compliment the overall shape and design of the vehicle 10. The depicted contour and overall shape of the roof ditches 14 can vary from vehicle to vehicle. Further the roof ditches 14 are depicted as extending in a longitudinal direction between front and rear ends of the roof panel 18 and side panels 20. Other orientations and directional orientations are possible and are within the scope of the invention.

Each of the roof ditches 14 and the roof ditch molding each caps 16 is identical to one another, respectively, except that they are symmetrically shaped mirror images of one another. Accordingly, the description of one roof ditch 14 and one roof ditch molding end cap 16 equally applies to both roof ditches and roof ditch molding end caps. Therefore, for the sake of brevity, only one of the roof ditches 14 and only one of the roof ditch molding end caps 16 are described below.

Figure 3:
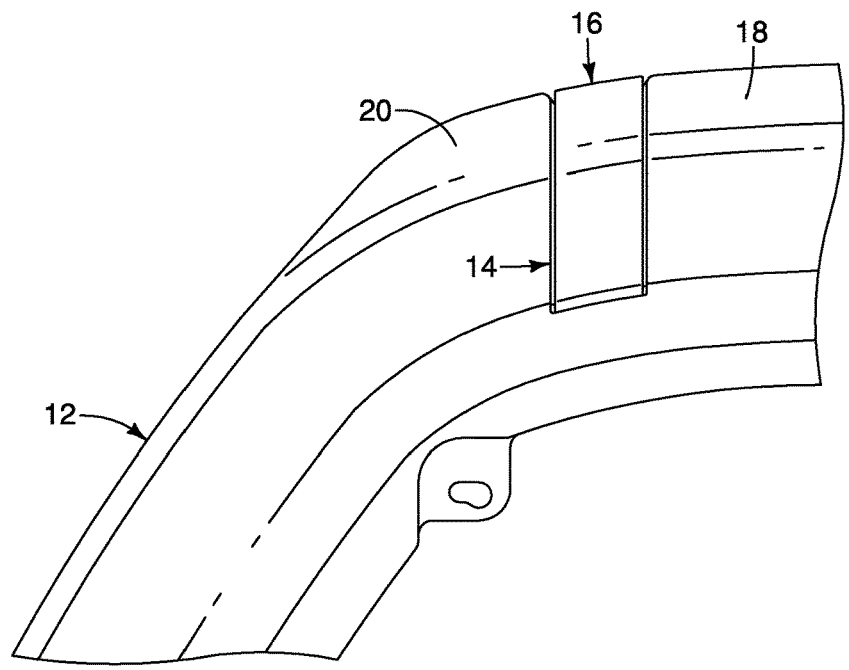
FIG. 3 is a rear elevational view of the vehicle of FIG. 1.
Figure 5:
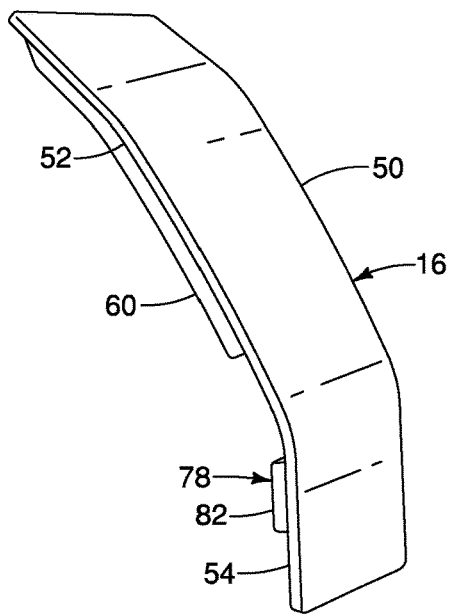
FIG. 5 is a perspective view of the roof ditch molding part of FIG. 1.
Figure 6:
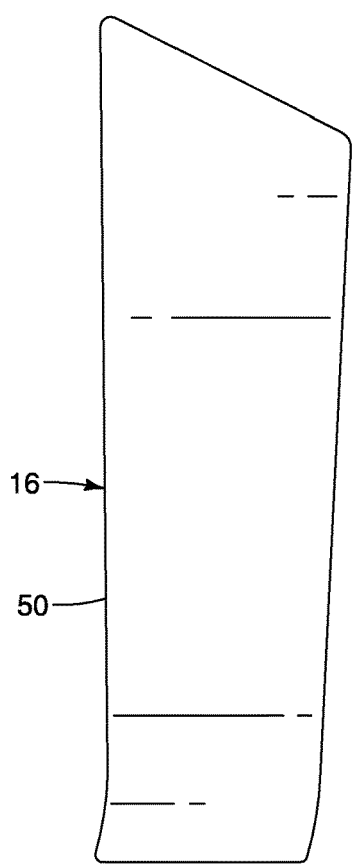
FIG. 6 is a top plan view of the roof ditch molding part of FIG. 5.
Figure 8:
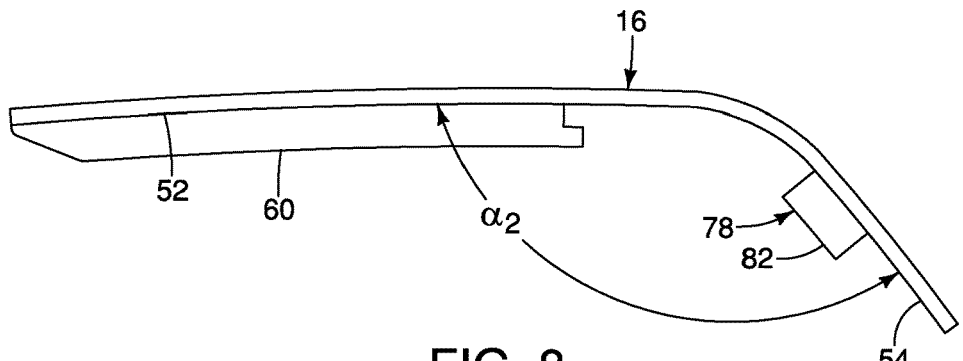
FIG. 8 is a side elevational view of the roof ditch molding part of FIG. 5.
Figure 11:
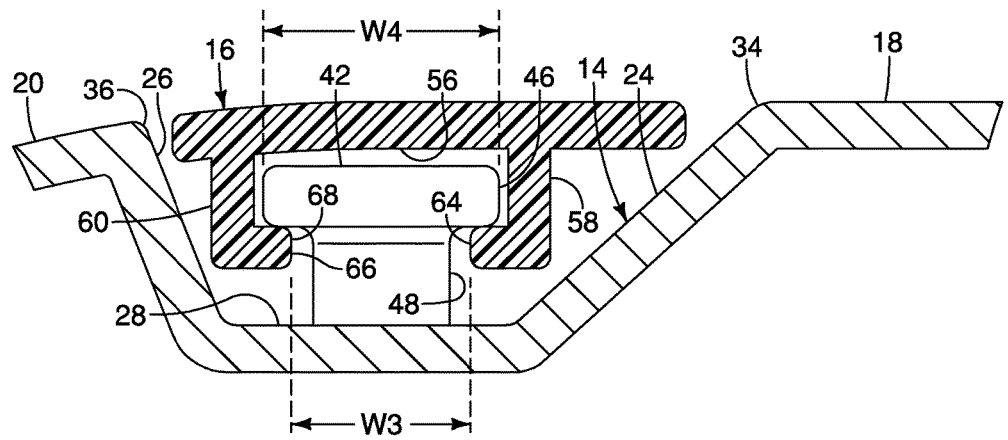
FIG. 11 is a rear elevational view in cross-section of the roof ditch molding part disposed in the roof ditch of FIG. 1.

As indicated in FIGS. 1, 8 and 11, the roof ditch 14 and the roof ditch molding end cap 16 both have a substantially arcuate shape. Specifically, as shown in FIGS. 3, 8 and 11, the roof ditch molding end cap 16 and the roof ditch 14 beneath the installed roof ditch molding end cap have substantially arcuate shapes when viewed from the side. When viewed from above, as shown in FIGS. 1 and 5, the roof ditch 14 has substantially parallel longitudinally extending sides. The overall shape of the roof ditch molding end cap 16 substantially corresponds to the shape of the roof ditch 14. Specifically, the exploded perspective view of FIG. 4 shows the roof ditch molding end cap 16 removed from the roof ditch 14, and illustrates the roof ditch molding end cap 16 having a shape corresponding to the shape of the roof ditch 14.

Figure 9:
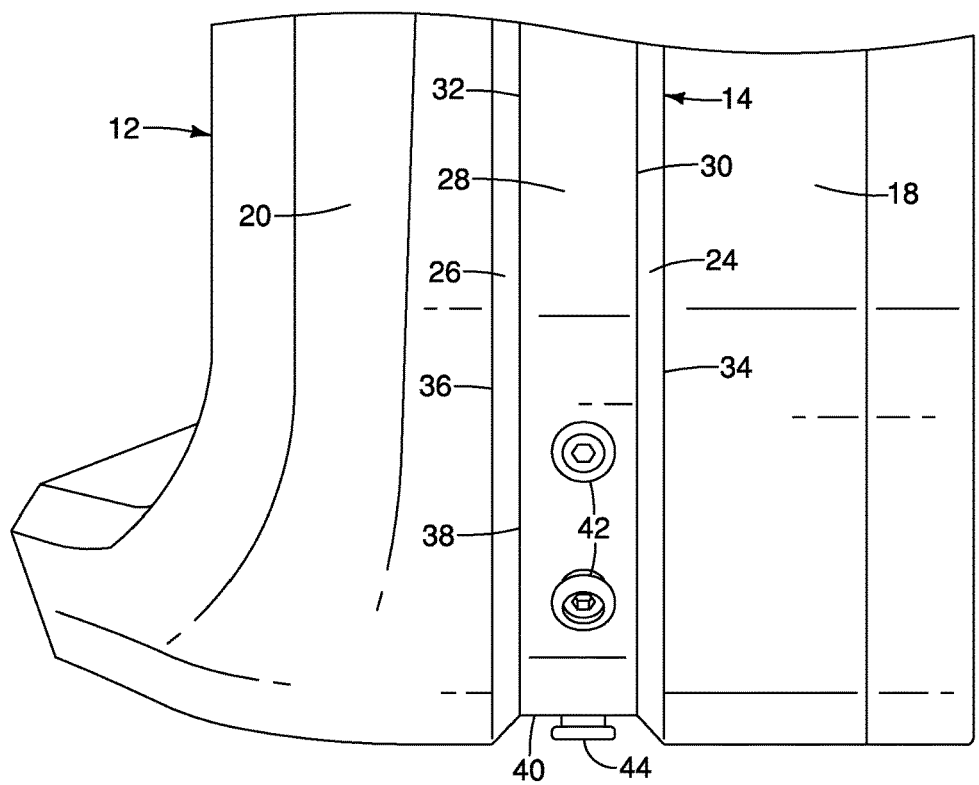
FIG. 9 is a top plan view of a rear portion of the vehicle of FIG. 1 without the roof ditch molding part being disposed in a roof ditch.
Figure 10:
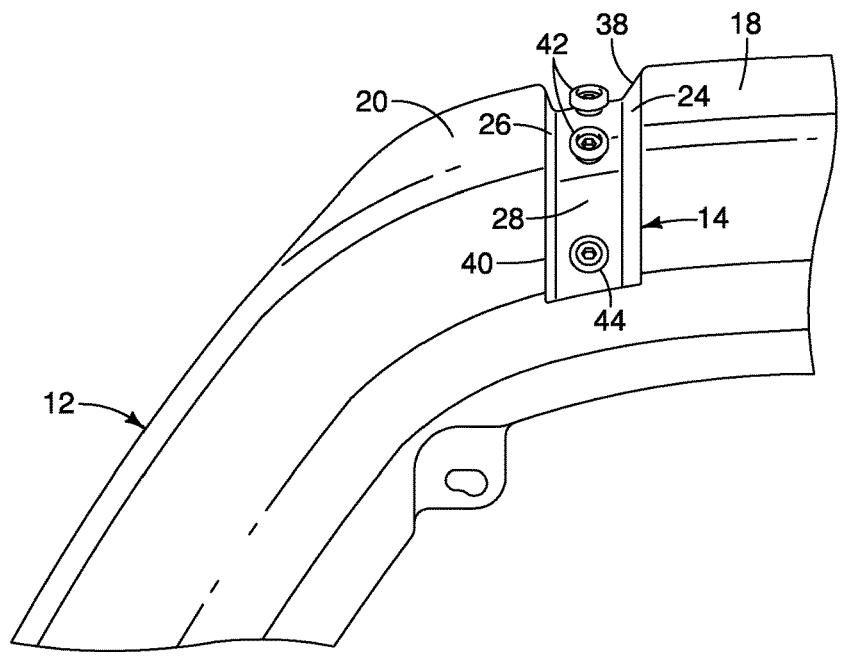
FIG. 10 is a rear elevational view of the roof ditch of FIG. 9.

Also, as shown in FIGS. 4, 9 and 10, the roof ditch 14 includes an inner, or first, wall surface 24 that is within a lateral boundary of the roof panel 18, an outer, or second, wall surface 26 that is positioned adjacent to the lateral boundary of the roof panel 18 and a recessed support surface 28 that extends laterally between the bottom edges 30 and 32 of the inner and outer wall surfaces 24 and 26. The inner wall surface 24 extends longitudinally along a first side of the recessed support surface 28 and the outer wall surface 26 extends longitudinally along a second side of the recessed support surface 28. The outer wall surface 26 is disposed outboard of the inner wall surface 24. The inner wall surface 24 terminates at a top inner edge 34 that is defined along the intersection of the inner wall surface 24 and the roof panel 18. Similarly, the outer wall surface 26 terminates at a top edge 36 that is defined along the intersection of the outer wall surface 26 and the adjacent one of the side panels 20. The inner wall surface 24, the outer wall surface 26 and the recessed support surface 28 therefore extend from the front section of the roof of the vehicle body structure 12 to the rear section of the roof of the vehicle body structure 12 in a longitudinal direction of the vehicle 10, as shown in FIGS. 1 and 4.

Figure 12:
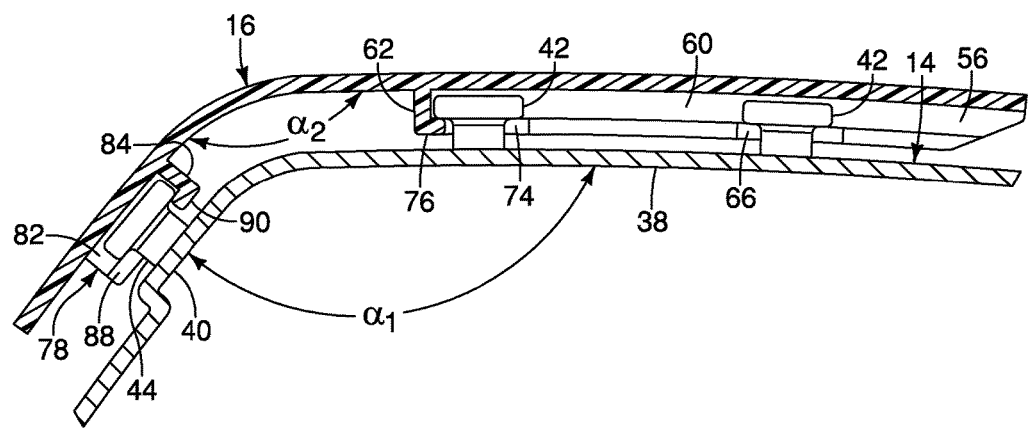
FIG. 12 is a side elevational view in cross-section of the roof ditch molding part disposed in the roof ditch of FIG. 1.

As shown in FIGS. 1, 4 and 9, the roof ditch 14 extends from a front section of the vehicle 10 to a rear section of the vehicle in the longitudinal direction of the vehicle. The roof ditch 14 includes a first section 38 and a second section 40, as shown in FIGS. 4, 9 and 10. The second section 40 is disposed at an angle α1 with respect to the first section 38, as shown in FIG. 12. In the depicted exemplary embodiment, the angle α1 is approximately 120 degrees. It should be understood that the angle α1 of the roof ditch can vary from approximately 90 degrees to approximately 120 degrees. The first section 38 of the roof ditch 14 is a horizontally extending portion of the roof ditch, and the second section 40 is a vertically extending portion of the roof ditch.

As shown in FIG. 4, the roof ditch 14 includes a plurality of fastening members disposed therein. The plurality of fastening members includes at least one first fastening member 42 and at least one second fastening member 44. Each of the first and second fastening members is preferably substantially identical. Specifically, each of the fastening members includes a head portion 46 and a shaft portion 48, as shown in FIG. 11. As shown in FIGS. 4, 11 and 12, the shaft portion 48 of each fastening member is rigidly fixed to and extends through the recessed support surface 28 of the roof ditch 14 to secure the fastening member to the vehicle body structure 12. The head portion 46 of each of the fastening members extends above the recessed support surface 48. However, the head portion 48 of each of the fastening members is disposed below the top edges 34 and 36 of the inner and outer wall surfaces 24 and 26, as shown in FIG. 11. The head portion 46 of the fastening members is dimensioned and shaped to receive the roof ditch molding end cap 16.

As shown in FIG. 9, at least one first fastening member 42 is disposed in the first section 38 of the roof ditch 14. As shown in FIG. 9, two first fastening members 42 are disposed in the roof ditch 14, although any suitable number of first fastening members can be used. The first fastening member 42 extends outwardly from the support surface 28 of the first section 38 of the roof ditch 14. Preferably, the first fastening member 42 extends substantially perpendicularly to the support surface 28, as shown in FIG. 11.

As shown in FIGS. 4 and 9, a second fastening member 44 is disposed in the second section 40 of the roof ditch 14. As shown in FIG. 9, one second fastening member 44 is disposed in the second section 40 of the roof ditch 14, although any suitable number of second fastening members can be used. The second fastening member 44 extends outwardly from the support surface 28 of the second section 40 of the roof ditch 14, as shown in FIGS. 4 and 9. Preferably, the second fastening member 44 extends substantially perpendicularly to the support surface 28. The second fastening member 44 preferably extends in a direction substantially perpendicular to the direction in which the at least one first fastening member 42 extends, as shown in FIG. 12.

The roof ditch molding end cap 16, as shown in FIGS. 4, 5, 7 and 8, includes a body member 50 having a first attachment surface 52 and a second attachment surface 54. The second attachment surface 54 is disposed at an angle α2 with respect to the first attachment surface, as shown in FIG. 8. The angle α2 preferably corresponds to the angle between the first and second sections 38 and 40 of the roof ditch 14 of the vehicle 10. In the depicted exemplary embodiment shown in FIGS. 8 and 12, the angle α2 is approximately 120 degrees. It should be understood that the angle α1 of the roof ditch can vary from approximately 90 degrees to approximately 120 degrees. The roof ditch molding end cap 16 is shaped to extend partially into and cover the roof ditch 14, as shown in FIGS. 1-3.

Figure 7:
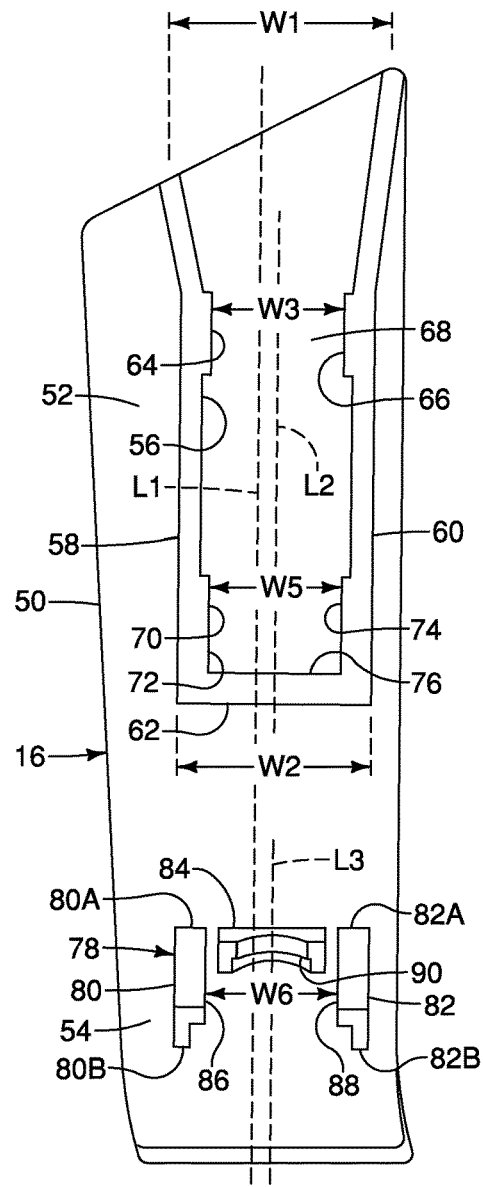
FIG. 7 is a bottom plan view of the roof ditch molding part of FIG. 5.

The first attachment surface 52 is configured to slidably engage the roof ditch 14 of the vehicle 10. The first attachment surface 52 has a slot 56 configured to engage at least one first fastener 42 disposed in the roof ditch 14 of the vehicle 10, as shown in FIGS. 11 and 12. The slot 56 is defined by first and second longitudinally extending walls 58 and 60, as shown in FIGS. 7 and 11. The first and second longitudinally extending walls 58 and 60 are preferably spaced inwardly from the respective edges of the body member 50, as shown in FIG. 7. First ends of the first and second longitudinally extending walls 58 and 60 define an open end of the slot 56. A third wall 62 extends between second ends of the first and second longitudinally extending walls 58 and 60 to define a closed end of the slot 56. The open end of the slot 56 is flared outwardly to facilitate receiving the at least one first fastener 42 such that a width W1 of the slot 56 at the open end is larger than a width W2 of the slot at the closed end, as shown in FIG. 7. A longitudinal centerline L2 of the slot 56 is offset from a longitudinal centerline L1 of the body member 56 of the roof ditch molding end cap 16.

First lips 64 and 66 extend inwardly from the first and second walls 58 and 60 to facilitate receiving the at least one fastening member 42, as shown in FIGS. 7 and 11. A first fastener receiving section 68 of the slot is defined by the first lips 64 and 66 extending inwardly from each of the first and second walls. The first lips 64 and 66 extend inwardly toward the longitudinal centerline L2 of the slot 56. A width W3 between the free ends of the first lips 64 and 66 is less than a width W4 of the head portion 46 of the first fastening member 42, as shown in FIG. 11. The width W4 of the head portion 46 of the first fastening member 42 being larger than the width W3 of the first lips 64 and 66 in the first fastener receiving area 68 substantially prevents the roof ditch molding end cap 16 from being removed in a direction substantially perpendicular to the longitudinal direction in which the recessed support surface 28 extends in the first section 38 of the roof ditch 14.

A second fastener receiving section 70 of the slot 56 is defined by second lips 72, 74 and 76 extending inwardly from each of the first, second and third walls 58, 60 and 62, respectively, as shown in FIG. 7. A width W5 between the free ends of the second lips 72 and 74 is substantially equal to the width W3 between the free ends of the first lips 64 and 66. Accordingly, the width W5 between the free ends of the second lips 72 and 74 extending inwardly from the first and second walls 58 and 60 is less than a width W4 of the head portion 58 of the first fastening member 42 received in the second fastener receiving section 70. The width W4 of the head portion 46 of the first fastening member 42 being larger than the width W5 of the second lips 72 and 74 in the second fastener receiving area 70 substantially prevents the roof ditch molding end cap 16 from being removed in a direction substantially perpendicular to the longitudinal direction in which the recessed support surface 28 extends in the first section 38 of the roof ditch 14. The first fastener receiving section 68 is disposed between the open end of the slot 56 and the second fastener receiving section 70, as shown in FIG. 7.

The second attachment surface 54 has a locking member 78, as shown in FIGS. 7 and 12, configured to engage a second fastening member 44 disposed in the roof ditch 14 of the vehicle body structure 12 to substantially prevent movement of the roof ditch molding end cap 16 upon installation. The locking member 78 is preferably substantially U-shaped. The locking member 78 has first and second longitudinally extending legs 80 and 82 having a first end and a second end, and a third leg 84 extending between the first and second longitudinally extending legs 80 and 82. Preferably, the third leg 84 extends between first ends 80A and 82A of the first and second longitudinally extending legs 80 and 82, as shown in FIG. 7. The first ends 80A and 82A of the first and second longitudinally extending legs 80 and 82 are disposed closer to the slot 56 then the second ends 80B and 82B. Third lips 86, 88 and 90 extend inwardly from the first, second and third legs 80, 82 and 84, respectively, of the locking member 78 to facilitate securely retaining the second fastener 44. A width W6 between the free ends of the lips 86 and 88 is less than a width W4 of the head portion 46 of the second fastening member 44, as shown in FIG. 12. The width W4 of the head portion 46 of the second fastening member 44 being larger than the width W6 of the third lips 86 and 88 of the locking member 78 substantially prevents the roof ditch molding end cap 16 from being removed in a direction substantially perpendicular to the longitudinal direction in which the recessed support surface 28 extends in the second section 40 of the roof ditch.

As shown in FIG. 7, first ends 80A and 82A of the first and second longitudinally extending legs 80 and 82 are spaced from opposite ends of the third leg 84. Alternatively, the first, second and third legs 80, 82 and 84 can be formed as a single, connected member. A longitudinal centerline L3 of the locking member 78 is offset from the longitudinal centerline L1 of the body member 50. The longitudinal centerline L3 of the locking member 78 is preferably collinear with the longitudinal centerline L2 of the slot 56.

The widths W3 and W5 of the first and second fastening member receiving areas 68 and 70 of the slot 56 substantially prevent the roof ditch molding end cap 16 from installed in a direction perpendicular to the direction in which the roof ditch 14 extends in the first section 38 of the roof ditch. Accordingly, the roof ditch molding end cap 16 is installed by sliding the roof ditch molding end cap 16 in a forward direction of the vehicle 10, as shown in FIG. 4. The flared open end of the slot 56, as shown in FIG. 7, facilitates receiving the first fastening member 42 with the roof ditch molding end cap 16. The roof ditch molding end cap 16 is slid forward until the first fastening members 42 are received by the fastening member receiving areas 68 and 70 of the slot 56. The second attachment surface 54 of the roof ditch molding end cap 16 is then pushed in a direction toward the recessed support surface 28 in the second section 40 of the roof ditch 14 to engage the locking member 78 with second fastening member 44. The legs 80, 82 and 84 of the locking member 78 flex outwardly to receive the second fastening member 44.

The widths of the first and second fastening member receiving areas 68 and 70 of the slot 56 are smaller than the widths of the head portions 46 of the first fastening members 42, thereby substantially preventing movement of the roof ditch molding end cap 16 in a direction away from the support surface 28. Similarly, the third lips 86, 88 and 90 are sized to substantially prevent movement of the roof ditch molding end cap 16 in a direction away from the support surface 28. The third leg 84 of the locking member 78 is disposed forward the second fastening member 44 to substantially prevent movement of the roof ditch molding end cap 16 in a rearward direction of the vehicle 10.

The roof ditch molding end cap 16 can be made of, for example, a plastic material, a polymer material, a metallic material or other materials suitable for use in an exterior automotive application. Alternatively, the body member of the roof ditch molding end cap is made of a plastic material, and the slot and the locking member are made of a metallic material.

Spacing is provided between the installed roof ditch molding end cap 16 and the roof and side panels 18 and 20 to accommodate expansion and contraction of the roof ditch molding end cap in response to changes in temperature that differs from the thermal expansion and contraction rates of the roof and side panels 18 and 20 of the vehicle body structure 12. The roof and side panels 18 and 20 of the vehicle body structure 12 are preferably made of metal. Accordingly, when the roof ditch molding end cap 16 and the vehicle body structure 12 are made of different materials, the roof ditch molding end cap 16 can undergo expansion and contraction in response to changes in temperature that differ from the thermal expansion and contraction rates of the vehicle body structure 12.

Figure 13:
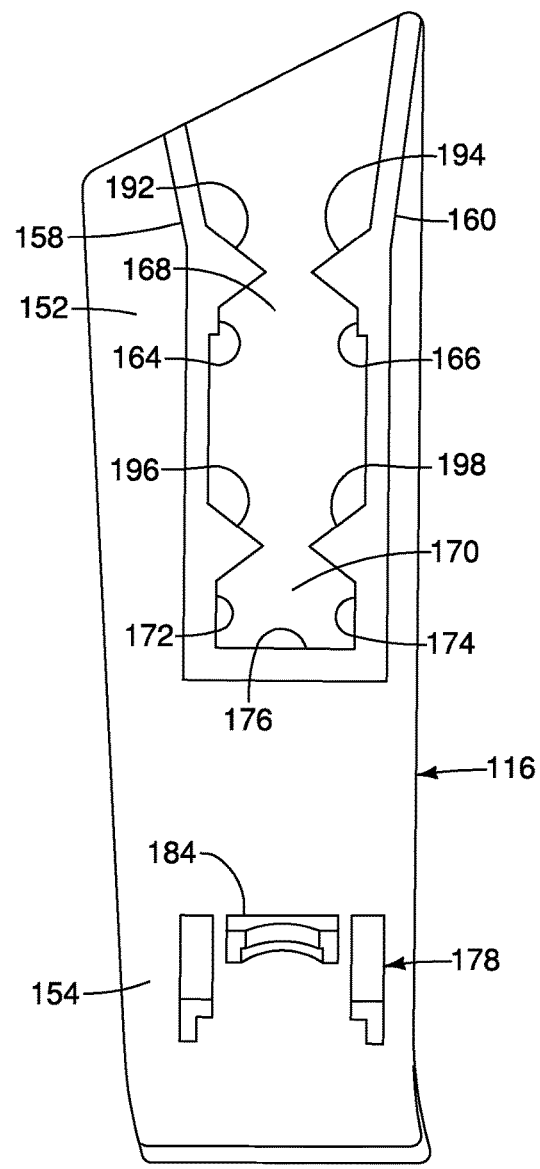
FIG. 13 is a bottom plan view of a roof ditch molding part in accordance with a second exemplary embodiment of the present invention.

As shown in FIG. 13, a roof ditch molding end cap 116 in accordance with a second exemplary embodiment of the present invention is substantially similar to the roof ditch molding end cap 16 of the first exemplary embodiment except for the differences described below. Similar parts are identified with similar reference numerals, except increased by 100 (i.e., 1xx, accordingly).

A first pair of locating members 192 and 194 extend inwardly from the first and second legs 158 and 160 forward of the first fastening member receiving section 168. A second pair of locating members 196 and 198 extend inwardly from the first and second legs 158 and 160 forward of the second fastening member receiving section 170. The first pair of locating members 192 and 194 are disposed directly opposite one another on the first and second legs 158 and 160. The second pair of locating members are disposed directly opposite one another on the first and second legs 158 and 160. The first pair of locating members 192 and 194 are disposed forward of the second pair of locating members 196 and 198. A width between the respective pairs of locating members is substantially equal, and less than the width W4 (FIG. 11) of the head portion 46 of the first fastening member 42.

During installation of the roof ditch molding end cap 116, the locating members provide an indication, such as an audible or haptic indication, when the first fastening members 42 (FIG. 4) pass through the pairs of locating members as the roof ditch molding end cap is slid in the forward direction of the vehicle 10 (FIG. 1). Accordingly, such indication provides an installer with a position of the first fastening members 42 relative to the roof ditch molding end cap 116. Additionally, the first fastening members 42 are received rearward of the pairs of locating members, such that the locating members prevent forward movement of roof ditch molding end cap 116 because the widths between the respective pairs of locating members is less than the width W4 (FIG. 11) of the first fastening members 42. When the locating members are provided, the locking member 178 can be used solely for alignment purposes and does not need to lockingly engage the second fastening member 44.

Figure 14:
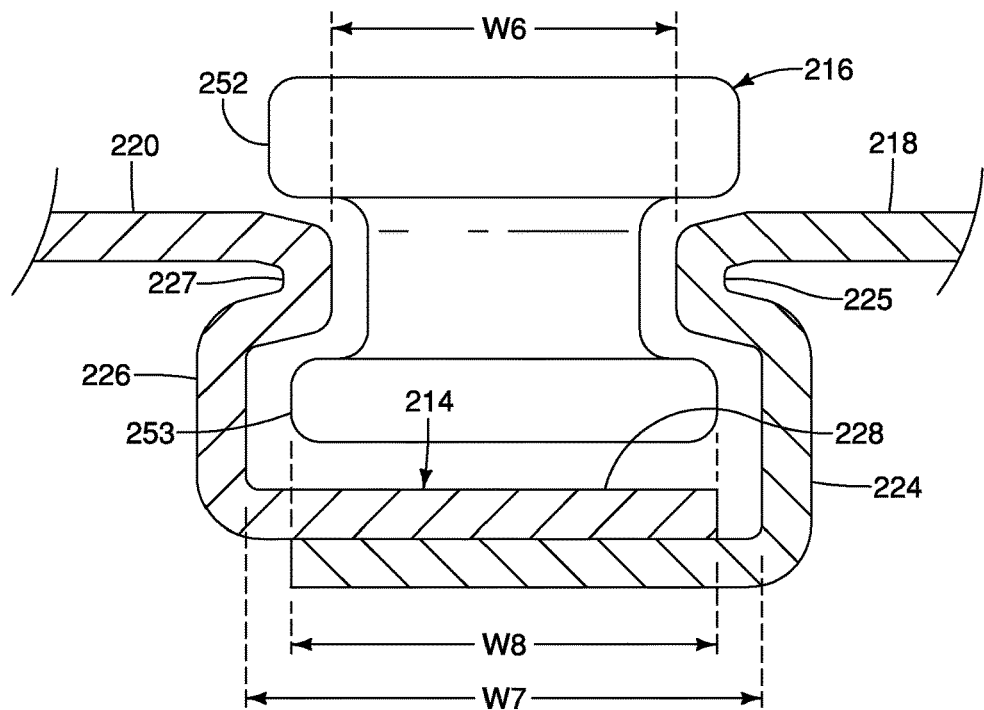
FIG. 14 is a rear elevational view of a roof ditch molding part disposed in a roof ditch of a vehicle in accordance with a third exemplary embodiment of the present invention.
Figure 15:
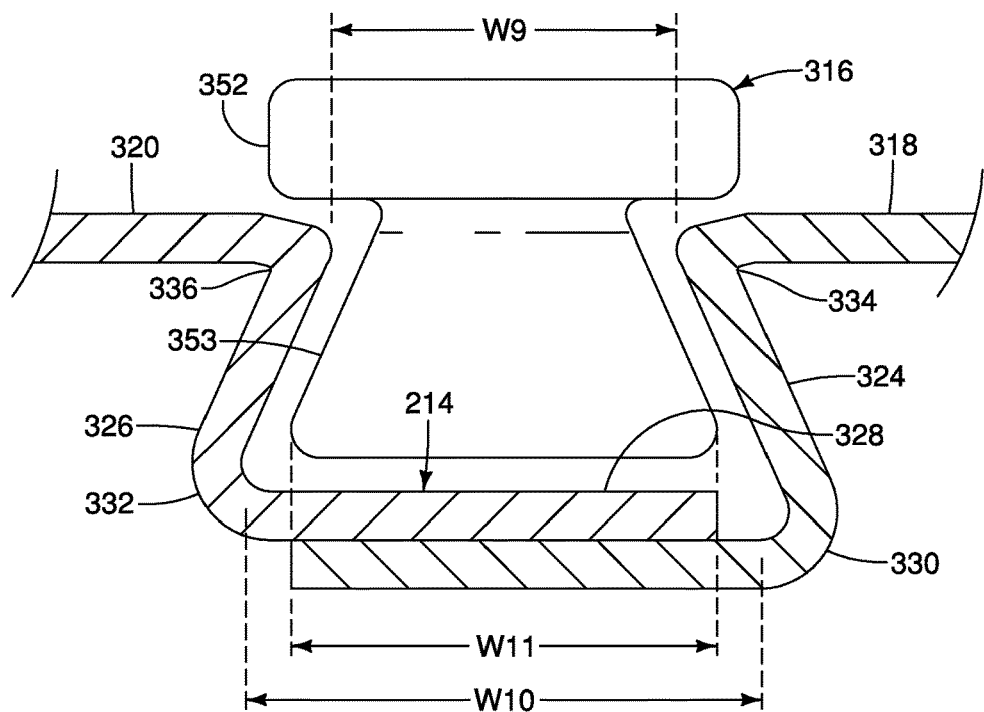
FIG. 15 is a rear elevational view of a modified roof ditch molding part of FIG. 14 disposed in a roof ditch of a vehicle.

As shown in FIGS. 14 and 15, a roof ditch molding end cap in accordance with a third exemplary embodiment of the present invention is substantially similar to the roof ditch molding end cap 16 of the first exemplary embodiment except for the differences described below. Similar parts are identified with similar reference numerals, except increased by 200 (i.e., 2xx, accordingly).

In the embodiment shown in FIGS. 14 and 15, the roof ditch molding end cap is provided for use with a roof ditch that does not have fastening members disposed in the first section of the roof ditch. The second section of the roof ditch 214 is similarly configured as described with respect to the second section 40 of the roof ditch 14 of the first exemplary embodiment.

The roof ditch 214 defined by the roof and side panels 218 and 220 has an inner wall surface 224 and an outer wall surface 226, as shown in FIG. 14. Projections 225 and 227 of the inner and outer wall surfaces 224 and 226 extend inwardly toward one another. A width W6 between the projections 225 and 227 is smaller than a width W7 between the inner and outer wall surfaces 224 and 227.

A first attachment surface 252 has an outwardly projecting attachment member 253 configured to be received by the roof ditch 214. The shape of the attachment member 253 substantially corresponds to the shape of the roof ditch when viewed in the longitudinal direction of the vehicle, as shown in FIG. 14. A largest width W8 of the attachment member 253 is larger than a smallest width W6 of the roof ditch 214 to prevent insertion and removal of the roof ditch molding end cap 216 in a direction substantially perpendicular to the support surface 228 of the roof ditch 214. The width W8 of the attachment member 253 is less than the width W7 of the inner and outer surfaces 224 and 226 to accommodate contraction and expansion of the roof ditch molding end cap 216. The second attachment surface of the roof ditch molding end cap 216 is substantially similar to the second attachment surface 54 of the roof ditch molding end cap 16 such that the second attachment surface is secured to the second section of the roof ditch 214 as described with respect to the first exemplary embodiment.

A modified roof ditch 314 and roof ditch molding end cap 316 is shown in FIG. 15. The roof ditch 314 defined by the roof and side panels 318 and 320 has an inner wall surface 324 and an outer wall surface 326, as shown in FIG. 14, that tapers outwardly when viewed in the longitudinal direction of the vehicle 10 (FIG. 1). The inner wall surface 324 tapers outwardly from the inner top edge 334 toward the bottom inner edge 330, and the outer wall surface 326 tapers outwardly from the outer top edge 336 toward the outer bottom edge 332. A width W9 between the top edges 334 and 336 is smaller than a width W10 between the bottom edges 330 and 332.

A first attachment surface 352 has an outwardly projecting attachment member 353 configured to be received by the roof ditch 314. The shape of the attachment member 353 substantially corresponds to the shape of the roof ditch 314 when viewed in the longitudinal direction of the vehicle, as shown in FIG. 15. A largest width W11 of the attachment member 353 is larger than a smallest width W9 of the roof ditch 314 to prevent insertion and removal of the roof ditch molding end cap 316 in a direction substantially perpendicular to the support surface 328 of the roof ditch 314. The width W11 of the attachment member 353 is less than the width W10 of the bottom edges 330 and 332 to accommodate contraction and expansion of the roof ditch molding end cap 316. The second attachment surface of the roof ditch molding end cap 316 is substantially similar to the second attachment surface 54 of the roof ditch molding end cap 16 such that the second attachment surface is secured to the second section of the roof ditch 314 as described with respect to the first exemplary embodiment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above exemplary embodiment, the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another exemplary embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the exemplary embodiments according to the present invention are provided for illustration only, and not for the purpose of limiting the invention as defined by the appended claims and their equivalents.

What is claimed is:

1. A roof ditch molding end cap for a roof ditch of a vehicle, the roof ditch molding end cap comprising:
a body member having a first attachment surface and a second attachment surface, the second attachment surface being disposed at an angle with respect to the first attachment surface,
the first attachment surface being configured to slidably engage a first fastening member fixed to the roof ditch of the vehicle, the first attachment surface having a slot configured to engage the first fastening member, the slot being defined by first and second longitudinally extending walls, a first end of the first and second longitudinally extending walls being an open end and a third wall extending between the first and second longitudinally extending walls at a second end thereof, and
the second attachment surface having a locking member configured to engage a second fastening member fixed to the roof ditch of the vehicle to substantially prevent movement of the roof ditch molding end cap.

2. The roof ditch molding end cap according to claim 1, wherein the angle is approximately 120 degrees.

3. The roof ditch molding end cap according to claim 1, wherein
the open end of the slot is flared outwardly to facilitate receiving the first fastening member.

4. The roof ditch molding end cap according to claim 1, wherein
a lip extends inwardly from each of the first and second walls to facilitate receiving the first fastening member.

5. The roof ditch molding end cap according to claim 1, wherein
at least two first fastening members are disposed in the roof ditch, and
a first fastening member receiving section of the slot is defined by a first lip extending inwardly from each of the first and second walls, and a second fastening member receiving section of the slot is defined by a second lip extending inwardly from each of the first, second and end walls.

6. The roof ditch molding end cap according to claim 5, wherein
the first fastening member receiving section is disposed between the open end of the slot and the second fastening member receiving section.

7. The roof ditch molding end cap according to claim 1, wherein
a longitudinal centerline of the slot is offset from a longitudinal centerline of the body member.

8. The roof ditch molding end cap according to claim 1, wherein
the locking member is substantially U-shaped.

9. The roof ditch molding end cap according to claim 1, wherein
the locking member has first and second longitudinally extending legs having a first end and a second end, and a third leg extending between the first end of the first and second longitudinally extending legs.

10. The roof ditch molding end cap according to claim 9, wherein
the first end of the first and second longitudinally extending legs is disposed closer to the slot then the second end.

11. The roof ditch molding end cap according to claim 10, wherein
a lip extends inwardly from each of the first, second and third legs of the locking member to facilitate securely retaining the second fastening member.

12. The roof ditch molding end cap according to claim 1, wherein
a longitudinal centerline of the locking member is offset from a longitudinal centerline of the body member.

13. A vehicle body structure, comprising:
a roof ditch defined by a support surface, a first wall surface extending outwardly from a first side of the support surface and a second wall surface extending outwardly from a second side of the support surface, the roof ditch having a second section disposed at a first angle with respect to a first section;

a first fastening member extending outwardly from the support surface of the first section of the roof ditch;

a second fastening member extending outwardly from the support surface of the second section of the roof ditch;

a roof ditch molding end cap connected to the first and second sections of the roof ditch, the roof ditch molding end cap including a body member having a first attachment surface and a second attachment surface, the second attachment surface being disposed at a second angle with respect to the first attachment surface, the first attachment surface slidably engaging the first fastening member in the first section of the roof ditch, the first attachment surface having a slot configured to engage the first fastening member, the slot being defined by first and second longitudinally extending walls, a first end of the first and second longitudinally extending walls being an open end and a third wall extending between the first and second longitudinally extending walls at a second end thereof, and the second attachment surface having a locking member receiving the second fastening member disposed in the second section of the roof ditch of the vehicle to substantially prevent movement of the roof ditch molding end cap with respect to the roof ditch.

14. The vehicle body structure according to claim 13, wherein the roof ditch molding end cap is configured to be slid in a forward direction of a vehicle to engage the first attachment surface of the roof ditch molding end cap with the first fastening member disposed in the first section of the roof ditch.

15. The vehicle body structure according to claim 14, wherein the first attachment surface has a slot receiving the first fastening member disposed in the first section of the roof ditch.

* * * * *